(12) United States Patent
Deivasigamani et al.

(10) Patent No.: US 12,163,670 B2
(45) Date of Patent: *Dec. 10, 2024

(54) HEATING SYSTEM

(71) Applicant: Intellihot, Inc., Galesburg, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 134 days.

This patent is subject to a terminal disclaimer.

(21) Appl. No.: 17/943,239

(22) Filed: Sep. 13, 2022

(65) Prior Publication Data

US 2023/0003395 A1 Jan. 5, 2023

Related U.S. Application Data

(62) Division of application No. 16/596,634, filed on Oct. 8, 2019, now Pat. No. 11,473,785.

(51) Int. Cl.
| | |
|---|---|
| *F24D 17/00* | (2022.01) |
| *F24D 19/10* | (2006.01) |
| *F24H 4/04* | (2006.01) |

(52) U.S. Cl.
CPC ..... *F24D 17/0068* (2013.01); *F24D 19/1054* (2013.01); *F24H 4/04* (2013.01)

(58) Field of Classification Search
None
See application file for complete search history.

(56) References Cited

U.S. PATENT DOCUMENTS

| | | | |
|---|---|---|---|
| 10,018,366 B2* | 7/2018 | Deivasigamani | ... F24D 19/1081 |
| 2010/0209084 A1 | 8/2010 | Nelson et al. | |
| 2010/0230071 A1* | 9/2010 | Slater | ...... F24T 10/00 |
| | | | 165/104.31 |
| 2014/0000308 A1* | 1/2014 | Komori | ...... F25B 1/00 |
| | | | 62/498 |
| 2016/0231006 A1* | 8/2016 | Deivasigamani | ... F24D 19/1081 |
| 2019/0128565 A1 | 5/2019 | Pugh et al. | |

* cited by examiner

*Primary Examiner* — Edelmira Bosques
*Assistant Examiner* — Deepak A Deean
(74) *Attorney, Agent, or Firm* — Jong Patent Firm; Cheng Ning Jong; Tracy P. Jong

(57) ABSTRACT

A system for heating a first fluid flow from a first temperature to a second temperature, the system including a hot water supply line for receiving the first fluid flow at a first end and exhausting the first fluid flow at a second end; and a heating system including a heat engine, a thermal battery and a heat exchanger, wherein the thermal battery is configured to be replenished at a point of heat transfer by the heat engine and the hot water supply line is configured to receive heat from the thermal battery via the heat exchanger to elevate the temperature of the first fluid flow from the first temperature to the second temperature.

4 Claims, 5 Drawing Sheets

HEATING SYSTEM

PRIORITY CLAIM AND RELATED APPLICATIONS

This divisional application claims the benefit of priority from non-provisional application U.S. Ser. No. 16/596,634 filed Oct. 8, 2019. Said application is incorporated by reference in its entirety.

BACKGROUND OF THE INVENTION

1. The Field of the Invention

The present invention relates to a domestic water heating system. More specifically, the present invention is directed to a domestic water heating system free from the potential of Legionella proliferation and a domestic water heating system that is not directly powered by a fossil fuel.

2. Background Art

Various fossil fuel phase-out initiatives have been made in the heating industry and mandates have been increasingly devised and implemented to phase out the direct or indirect use of fossil fuel in heat production for domestic and/or industrial uses. Attempts have been made to heat domestic water with alternative means, e.g., with the use of heat pumps whose operations are primarily driven using electricity in the form of pump or compressor operations. Supplemental electric heating elements may also be employed to aid a fossil fuel-free domestic water heating systems in meeting heating demands. However, the need to meet heating demands have driven designers to return to tanked solutions which bring back the disadvantages associated with such solutions, one of disadvantages being the availability of stagnant domestic water that is disposed at suitable temperature for Legionella proliferation when hot water demands are small over extended periods. Two examples of tanked solutions are included below where in each domestic hot water is supplied directly from a tank:

U.S. Pat. Pub. No. 20190128565 of Pugh et al. (hereinafter Pugh) discloses a heat pump water heater has a tank, a heat source, and a heat pump system. The heat pump system has a refrigerant path, at least a portion of which is in thermal communication with the water tank volume so that heat transfers from refrigerant to the water tank volume. A fan causes air to flow through a housing, and another portion of the refrigerant path includes an evaporator in the housing. The fan is within the housing and may further be within a second housing. The first housing may comprise a baffle to direct air flow. The fan may be a variable speed fan in communication with a controller, so that the controller controls the fan speed depending on a temperature of the refrigerant.

U.S. Pat. Pub. No. 20100209084 of Nelson et al. (hereinafter Nelson) discloses a heat pump water heater and systems and methods for its control. The systems are configured to heat water within a water storage tank of a heat pump water heater wherein a controller within the system is operatively connected to a plurality of heat sources including at least one electric heating element and a heat pump and sensors in order to selectively energize one of the plurality of heat sources. The controller is configured to process data representative of the temperature of water within the tank near the top of the water storage tank, and rate of water flowing out of the water storage tank, in order to automatically selectively energize the heat sources. The selection of heat sources by the controller is determined by a mode of operation selected by the user and the data processed by the controller in view of the selected mode of operation.

Each of Pugh and Nelson discloses the use of a large thermal storage tank that accommodates demands of hot water. As each of Pugh and Nelson's tanks holds a significant amount of water to anticipate demands, there is no guaranty that all portions of the heated water in the tank will exit the tank and be replaced with fresh cold or unheated water. If insufficiently used and the water held in the tank is not consumed or replaced over a long period of time, Legionella can proliferate and the next user/s can be exposed to a heightened level of Legionella risk.

There exists a need for a thermal battery-equipped domestic water heating system that is free from Legionella risks plaguing tanked domestic water heating systems.

SUMMARY OF THE INVENTION

In accordance with the present invention, there is provided a system for heating a first fluid flow from a first temperature to a second temperature, the system including:
 (a) a hot water supply line for receiving the first fluid flow at a first end and exhausting the first fluid flow at a second end; and
 (b) a heating system including:
  (i) a heat engine;
  (ii) a thermal battery; and
  (iii) a heat exchanger,
wherein the thermal battery is configured to be replenished at a point of heat transfer by the heat engine and the hot water supply line is configured to receive heat from the thermal battery via the heat exchanger to elevate the temperature of the first fluid flow from the first temperature to the second temperature.

In one embodiment, the heat engine includes a heat pump. In another embodiment, the heat engine includes a solar thermal collector. In another embodiment, the heat engine includes an electrically-powered heater. In one embodiment, the heat exchanger includes a plate type heat exchanger. In one embodiment, the thermal battery includes a tank configured to receive a second fluid flow. In one embodiment, the second fluid flow is a water flow or a glycol flow. In one embodiment, the thermal battery further includes a closed loop fluid conductor for circulating the second fluid flow that is configured to cause transfer of heat from the thermal battery to the first fluid flow at a heat transfer rate via the heat exchanger and a variable speed pump interposed within the closed loop conductor wherein the variable speed pump is configured to effect heat transfer at the heat transfer rate based on a demand of the first fluid flow by varying the flowrate of the second fluid flow. In one embodiment, the point of heat transfer includes a coil thermally adapted to the tank. The heat engine includes a heat pump and the coil is configured to receive a third fluid flow from the heat pump for heating the second fluid flow. In one embodiment, the fluid flow includes an unheated fluid flow and a recirculation of at least a portion of the fluid flow. In one embodiment, the system further includes a second heat exchanger configured to cause heat transfer between the heat engine and the unheated fluid flow. In one embodiment, the second heat exchanger includes a plate type heat exchanger.

In accordance with the present invention, there is further provided a system for heating a first fluid flow from a first temperature to a second temperature, the system including:

(a) a hot water supply line for receiving the first fluid flow at a first end and exhausting the first fluid flow at a second end;
(b) a heating system including:
   (i) a heat engine; and
   (ii) a thermal battery; and
(c) a heat exchanger,
wherein the hot water supply line, the heat engine and the thermal battery are configured to be thermally coupled in the heat exchanger, the hot water supply line is configured to be receive heat from at least one of the heat engine and the thermal battery to elevate the temperature of the first fluid flow from the first temperature to the second temperature and the thermal battery is configured to be replenished by the heat engine.

In accordance with the present invention, there is further provided a method for setting the setpoint temperature of a fluid stored in a thermal battery of a system for heating a first fluid flow from a first temperature to a second temperature, wherein the system further includes a hot water supply line for receiving the first fluid flow at a first end and exhausting the first fluid flow at a second end; a heating system including a heat engine; a heat exchanger; a flow meter configured for detecting a flowrate through the hot water supply line, a temperature sensor configured for sensing the temperature of the contents of the thermal battery, the thermal battery further includes a closed loop fluid conductor for circulating a second fluid flow that is configured to cause transfer of heat from the thermal battery to the first fluid flow at a heat transfer rate via the heat exchanger and a flow modifier interposed within the closed loop conductor wherein the flow modifier is configured to effect heat transfer at a heat transfer rate by varying the flowrate of the second fluid flow; and a controller operably connected to at least the flow meter, the temperature sensor and the flow modifier, wherein the thermal battery is configured to be replenished at a point of heat transfer by the heat engine and the hot water supply line is configured to receive heat from the thermal battery via the heat exchanger to elevate the temperature of the first fluid flow from the first temperature to the second temperature, the method including using the controller for:
(a) determining at least one event from flowrate data of the flow meter over a time period of a plurality of days, the event including a time span of a day in which the flowrate remains below or at a threshold value over the time span of a day within each day of the plurality of days;
(b) determining overlaps of each event to another one of the events of all days within the time period; and
(c) determining a frequency of the overlaps of each event over the time period and if the frequency exceeds a frequency threshold, executing a counteraction pair including a first action and a second action in opposition to the first action during a time span corresponding to each event, wherein the first action is executed at the start of the time span corresponding to each event, the second action is executed at the end of the time span corresponding to each event within a new time period.

In one embodiment, the counteraction pair includes:
(a) lowering the setpoint temperature of the contents of the thermal battery to a lower setpoint temperature and using the flow modifier to control the contents of the thermal battery to the lower setpoint temperature; and
(b) raising the temperature setpoint of the contents of the thermal battery to a higher setpoint temperature and using the flow modifier to control the contents of the thermal battery to the higher setpoint temperature.

An object of the present invention is to provide a domestic water heating system in which Legionella is incapable of surviving and/or thriving as water supply is not stored prior to its use.

Another object of the present invention is to provide a domestic water heating system that is not directly powered using a fossil fuel.

Another object of the present invention is to provide a domestic water heating system that is capable of storing thermal energy obtained via a heat pump and used only when a demand exists.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—heating system
4—heat engine
6—thermal battery
8—heat exchanger
10—hot water supply line
12—output of solar thermal collector
14—output of electrically-powered heater
16—tank
18—coil
20—heat exchanger
22—unheated flow
24—recirculated flow 26—pump
28—pump
30—expansion valve
32—evaporator fan
34—evaporator
36—compressor
38—wall
40—fill valve
42—housing
44—flapper
46—heat exchanger
48—inlet of refrigerant flow of heat pump into heat exchanger
50—outlet of refrigerant flow of heat pump leaving heat exchanger
52—inlet of domestic water flow into heat exchanger
54—outlet of domestic water flow leaving heat exchanger
56—inlet of closed loop conductor fluid of thermal battery into heat exchanger
58—outlet of closed loop conductor fluid of thermal battery leaving heat exchanger
60—heat transfer plate
62—modulating valve
64—period in which only external recirculation is active
66—flowrate spikes
68—flow meter

PARTICULAR ADVANTAGES OF THE INVENTION

The present system provides a domestic hot water supply that is not stored before its use, thereby eliminating the possibility of Legionella proliferation. Further, the present system provides a domestic hot water supply that does not require direct consumption of fossil fuel, thereby limiting the addition to the carbon footprint due to the use of the present system. The present system provides a mechanism for modulating the rate of heat transfer from a thermal battery to a flow to be heated.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
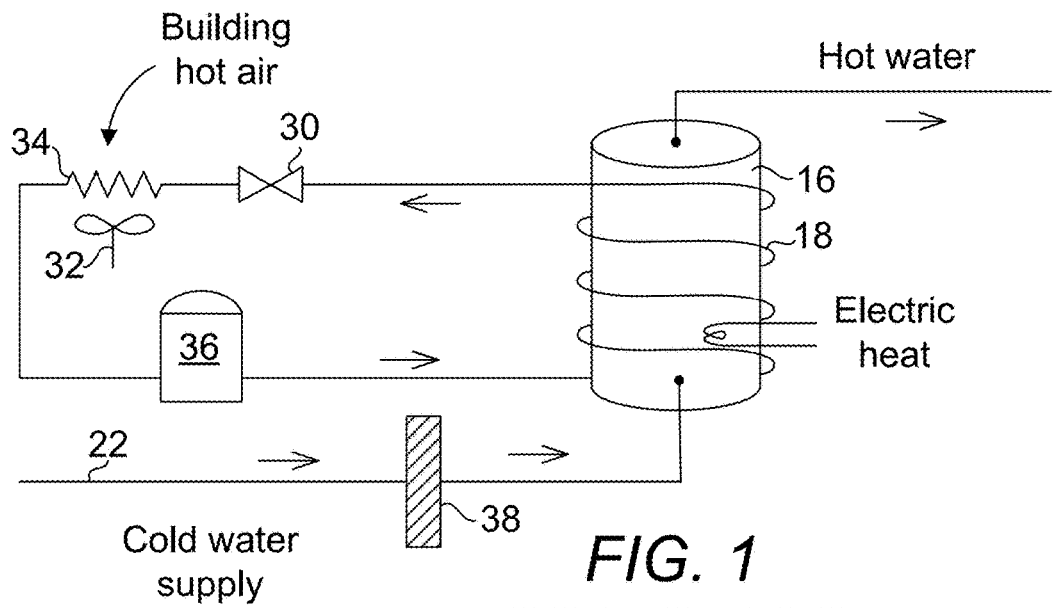
FIG. 1 is a diagram depicting a traditional heat pump heating system.
Figure 2:
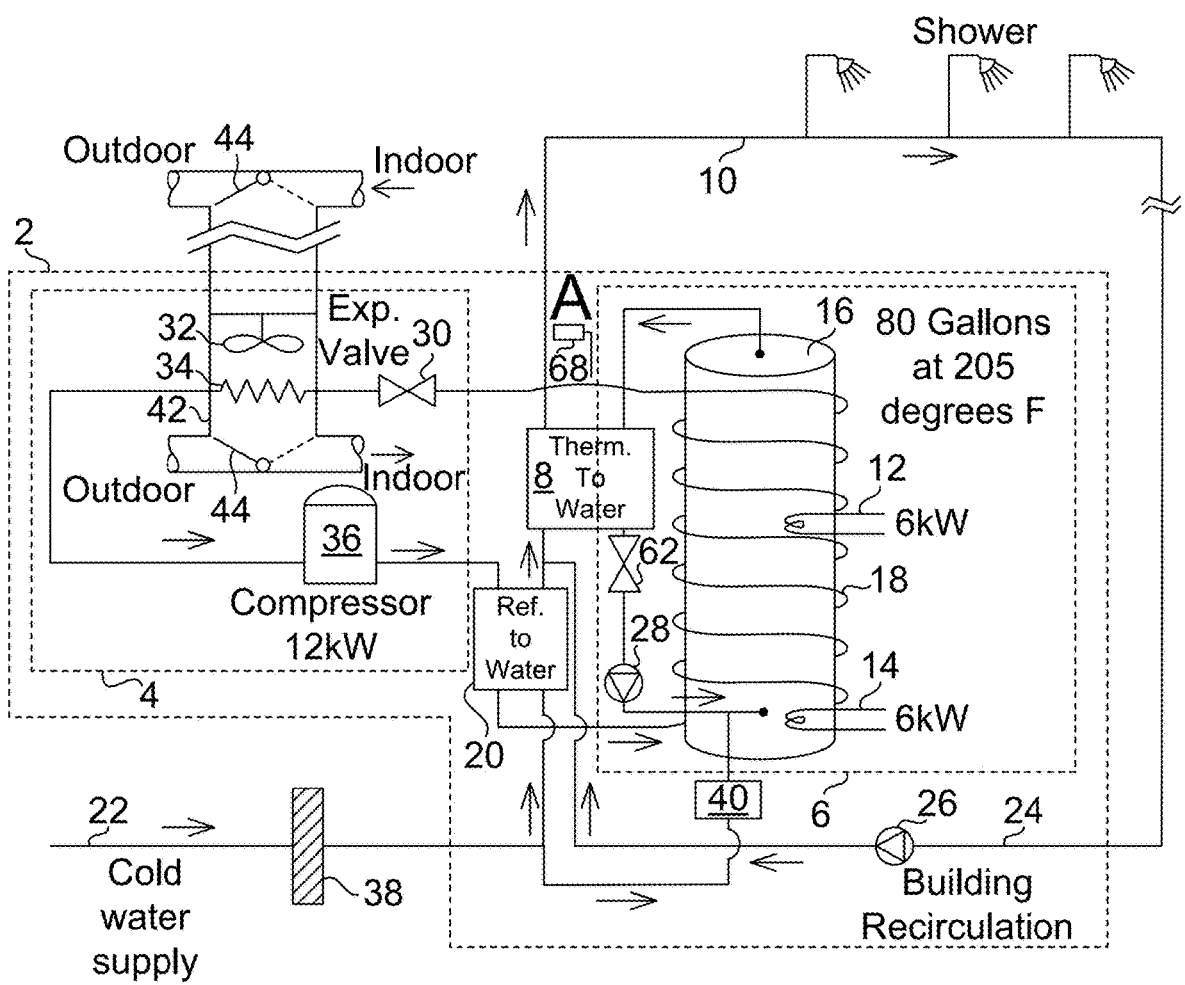
FIG. 2 is a diagram depicting one embodiment of a heat pump heating system.

FIG. 1 is a diagram depicting a traditional heat pump heating system 2. A tank is used not only to store energy gathered with a heat pump but also to provide hot water by heating an unheated water supply with the energy received and stored by the fluid in the tank. As the contents of the tank 16 is kept at a temperature meeting the needs of hot water users, e.g., significantly below 70 degrees C. (158 degrees F.), i.e., the temperature at which Legionellosis is killed but significantly above 20 degrees C. (68 degrees F.), the risk of Legionella exists in heating systems which store water at this temperature range due to the potential for the lack of a hot water demand, causing the heated water to stagnate in the tank. Below 20 degrees C. (68 degrees F.), Legionellosis survives but dormant. Therefore, if domestic water is stored in a tank for an extended period of time, e.g., 6 hours or more, at a temperature where Legionellosis can survive and/or thrive, a user of the hot water output of the tank can potentially be exposed to Legionella. The contents of tank 16 shown in FIG. 1 are heated with two heat sources. A first heat source is provided by a heat pump connected to a coil 18 to form a closed loop where the coil 18 is wrapped around and in thermal contacting engagement with the tank 16. Here, the heat pump is shown used to harness energy from air inside a building as air is drawn from the interior of a building and expelled back into the interior of the building. The heat pump is a flow line having an expansion valve 30, an evaporator fan 32 and an evaporator 34 functionally coupled to the evaporator fan 32 and a compressor 36. Disposed within the closed loop is refrigerant, e.g., R410A. When heating of the contents of the tank 16 is desired, both the compressor 16 and evaporator fan 32 are turned on. The compressor 36 compresses and pushes the refrigerant in the direction indicated. The temperature of the refrigerant flow increases upon compression by the compressor 36. As the compressed refrigerant flows through the coil 18, heat transfer occurs from the refrigerant to the contents of the tank 16 and the temperature of the refrigerant drops before reaching the expansion valve 30. The refrigerant temperature drops further after passing the expansion valve 30. The compressor 36 continues to increase the pressure and temperature of the refrigerant flow until it reaches the coil or condenser where heat transfer occurs from the refrigerant to the contents of the tank 16. As hot water is demanded, unheated water flow 22 enters the tank 16 from an external source and readily heated water exits the tank 16 to service the demand. If a demand continues to exist to a level that the entire contents of the tank 16 are replaced by new and unheated incoming water from the external source within, e.g., about 6 hours, the risk of Legionella survival and proliferation is kept to a minimum. However, if no demand exists for an extended period of time, e.g., over about 6 hours, the heated contents become a Legionella risk. In some cases, an additional heating source, e.g., an electric heater, is used. The electric heater is disposed in the tank 16, heating directly the contents of the tank 16. In the ensuing figures, the present invention, which serves to address this risk, will be discussed. FIG. 2 is a diagram depicting one embodiment of a heat pump heating system 2. It shall be noted in the present heating system 2 that a heat engine 4, e.g., a heat pump, is used to heat the contents of a thermal battery 6, e.g., a tank 16 containing a fluid, e.g., water or glycol, and a closed loop flow path having its flowrate controlled via a pump 28, etc. It shall also be noted that the thermal battery 6 is fluidly decoupled from the unheated flow 22 which is heated to result in a hot water flow in the hot water supply line 10. Therefore a fluid other than water, e.g., glycol, may be used as the thermal battery does not directly provide potable fluid to the user. The thermal battery 6 is configured to be replenished by a heat engine 4, e.g., a heat pump connected to a coil 18 that harnesses thermal energy from a space. In this embodiment, the unheated flow 22 is heated by means of two heat exchangers 8, 20. Heat exchanger 8, e.g., a plate type heat exchanger, thermally couples the closed loop flow path of the thermal battery 6 with the unheated flow 22 path. Heat exchanger 20, e.g., a plate type heat exchanger, thermally couples the heat pump 4 with the unheated flow 22. In use, the heat that has been stored or being stored in the tank 16 is transferred to the unheated flow 22, raising its temperature to a suitable temperature, e.g., 120 degrees F., at the hot water supply line 10 with the flowrate through which obtained using a flow meter 68. In one embodiment, an external recirculation of the heated flow is urged by pump 26 in the hot water supply line 10 to ensure that hot water can be provided at points of use, e.g., showers, when demanded. If the recirculated flow 24 is effected, the return flow is merged with the freshly heated flow post heat exchanger 20. It shall be noted that domestic water heating is accomplished in a flow path that is fluidly segregated from the contents of the tank 16. When hot water is requested, hot water is supplied through the hot water supply line 10. Unheated flow 22 passes through heat exchanger 20 before merging with the recirculated flow 24 to pass through heat exchanger 8. Although the recirculated flow 24 is disposed at a temperature lower than the effluent of heat exchanger 8 due to heat loss along the recirculated flow path, it is still disposed at a temperature higher than the unheated flow 22. Heat transfer between two flows is proportional to the difference in temperature of the two flows. Therefore, by coupling the output of a heat pump (post compressor 36 and prior to the coil 18) and the unheated flow 22, flows with the maximum difference in temperature are thermally coupled for maximum heat transfer rate in a heat exchanger. In one embodiment, pump 28 is a variable speed pump configured to effect heat transfer at a heat transfer rate, from the closed loop flow of the thermal battery 6 to the flow which eventually becomes the hot water supply line 10 based on the demand at the points of use, by varying, e.g., the fluid flowrate in the closed loop conductor of the thermal battery 6. The availability of this variable speed pump allows the modulation of heat transfer to the domestic water flow such that it can be controlled to the setpoint temperature, e.g., 120 degrees F. of the heating system 2 without relying solely on the supplemental heating elements which supply outputs 12, 14. The speed of pump 28 is generally increased to cycle the fluid in the closed loop conductor at a higher rate to increase the heat transfer rate from the fluid in the closed loop conductor to the unheated flow 22. When a hot water demand is very small, e.g., 0.5 Gallons Per Minute (GPM), the variable speed pump may not be capable of operating at a speed setting sufficiently low to match the very small demand as there is a lower speed limit to the variable speed pump. If the variable speed pump 28 is run at its minimum speed and the fluid of the thermal battery 6 is disposed at, e.g., about 200 degrees F. (lower than a desired thermal battery fluid temperature of, e.g., about 205 degrees F.) to match the very small demand, the system may not be able to provide hot water at a desired temperature. By disposing a modulating valve 62 on the same fluid conductor the variable speed pump is disposed, the modulating valve 62 will be capable of restricting or lowering the flowrate in the closed loop conductor of the thermal battery 6 without requiring the thermal battery fluid temperature to be dropped from the normal setting of, e.g., about 205 degrees F. In servicing demands outside of the very small demand, the modulating valve 62 would be disposed in its fully open position. In one embodiment, a constant speed pump is used instead of a variable speed pump as the flowrate of the closed loop flow can be controlled using the modulating valve 62. In one embodiment, modulating valve 62 is unnecessary as the variable speed pump can already generate a closed loop flow flowrate required. Collectively, either a variable speed pump or a combination of a pump (fixed or variable speed) and a valve can be considered a flow modifier as it is capable of altering the flowrate of the flow the flow modifier controls.

In one embodiment, an output of a solar thermal collector 12 is used to increase the total heat transfer rate to the thermal battery 6. In another embodiment, an output of an electrically-powered heater 14 is used to increase the total heat transfer rate to the thermal battery 6. Such supplemental heating is critical when the heating system 2 is incapable of relying solely upon the heat engine 4 to meet the hot water flowrate demanded. The air drawn by the evaporator fan 32 is guided by a housing 42 which splits into two channels, one of which is directed into an indoor environment and the other one into an outdoor environment. The air inlet source can also be chosen from either the interior or exterior of the building in which the present heating system is disposed. As air is drawn by the evaporator fan 32, e.g., from either the interior or exterior of a building, toward the evaporator 34, heat is transferred via the evaporator 34 to the refrigerant flow in the heat engine 4 which continues to be drawn by the compressor 36. A flapper 44 is used for selecting whether the indoor or outdoor air is drawn into the housing 42 and directed out of the housing 42. Each flapper 44 is pivoted at one end and used for blocking one of the two paths (indoor and outdoor) such that air flow can occur in the path that is unblocked. For instance, during winter months, the flapper 44 at the inlet end may be disposed in a position to allow air flow from the outdoor environment and the flapper 44 at the outlet end may be disposed in a position to allow flow into the outdoor environment. During summer months, the flapper 44 at the inlet end may be disposed in a position to allow flow from the indoor environment and the flapper 44 at the outlet end may be disposed in a position to allow flow into the indoor environment.

The tank 16 may be filled with water or another fluid with suitable specific heat. In one embodiment, the fluid is water. In another embodiment, glycol is used. If freezing risk is high due to the potential exposure of the heating system 2 to below-freezing temperatures, glycol may be used. Otherwise, water is a preferred medium as it is readily available. If water is used as the heat storage medium in the thermal battery 6, the tank 16 and its closed loop conductor can initially be filled using a portion of the unheated flow 22. This step needs to be performed only at the time of installation of the heating system 2. In doing this, a fluid conductor is used to connect the unheated flow 22 and the closed loop conductor of the thermal battery 6. A fill valve 40 disposed in this fluid conductor is actuated such that the tank 16 and its closed loop conductor are completely filled before the valve shuts off automatically. A manually-controlled valve may also be used.

It can be summarized that, in order to heat a domestic water flow from a first temperature to a second temperature, the present system includes a hot water supply line for receiving the first fluid flow at a first end and exhausting the first fluid flow at a second end and a heating system. The heating system includes a heat engine, a thermal battery and a heat exchanger. The thermal battery is configured to be replenished at a point of heat transfer by the heat engine and the hot water supply line is configured to receive heat from the thermal battery via the heat exchanger to elevate the temperature of the first fluid flow from the first temperature to the second temperature.

In one embodiment, the size of the tank 16 is configured to hold about 80 gallons with the temperature of the fluid in the tank 16 disposed at about 205 degrees F. The unheated flow is disposed at about 40 degrees F. and its temperature is to be raised to about 140 degrees F. At a heat pump output of about 12 kW and the supplemental heating elements (heating elements powered, e.g., by solar thermal collector and/or electric power) of about 12 kW, hot water can be provided continuously at a flowrate of about 1.6 GPM. A complete charge of the thermal battery 6 can provide a supply of hot water of about 232 gallons.

Figure 3:
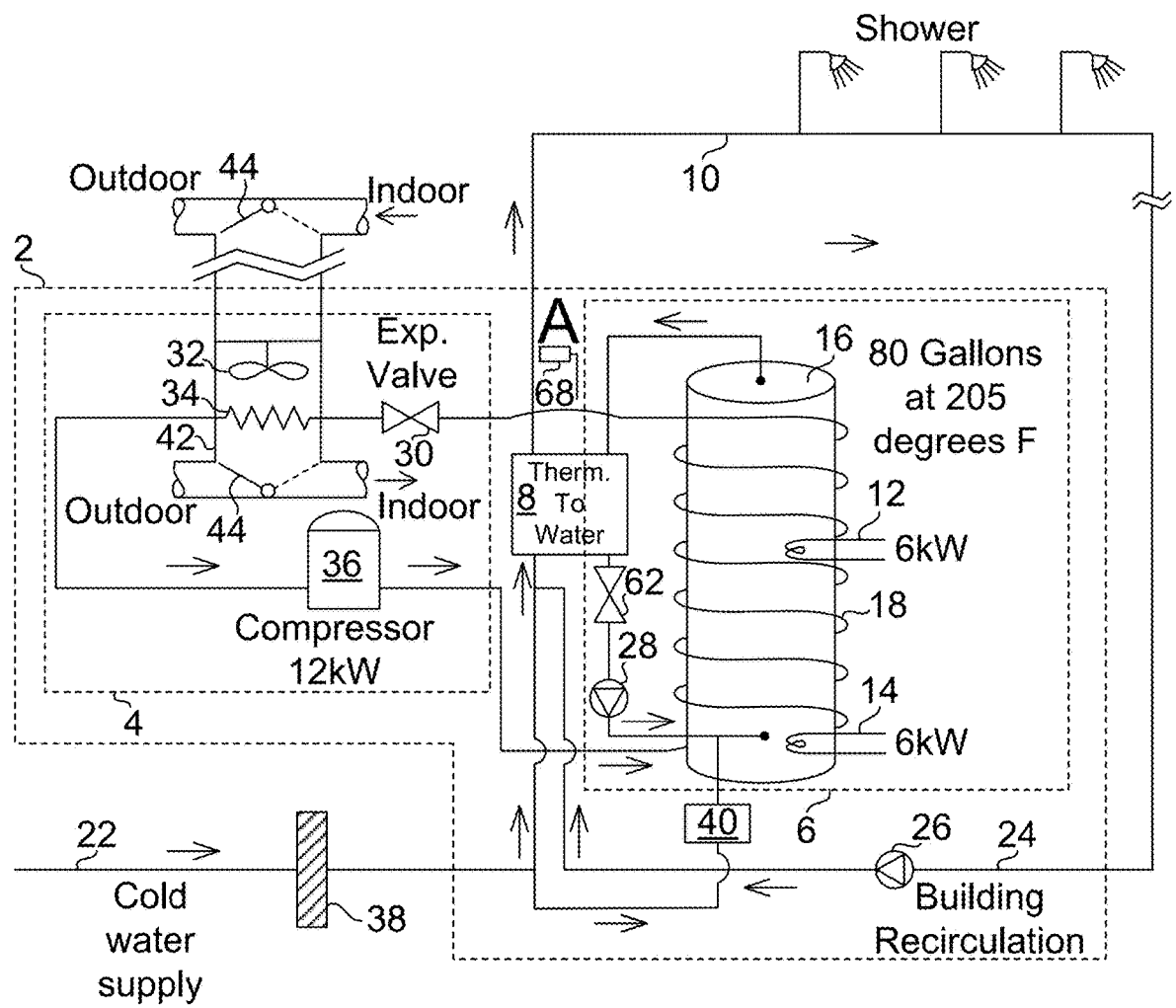
FIG. 3 is a diagram depicting another embodiment of a heat pump heating system.

FIG. 3 is a diagram depicting another embodiment of a heat pump heating system 2. Here, only one heat exchanger 8 is used. Both unheated flow 22 and recirculation flow 24 merge prior to arriving at the heat exchanger 8. If the storage capacity of the thermal battery 6 is sufficiently large and capable of meeting a continuous demand, this embodiment of the heat pump heating system 2 is preferable as it is simpler, does not require a second heat exchanger and therefore can be provided at a lower procurement and maintenance costs.

Figure 4:
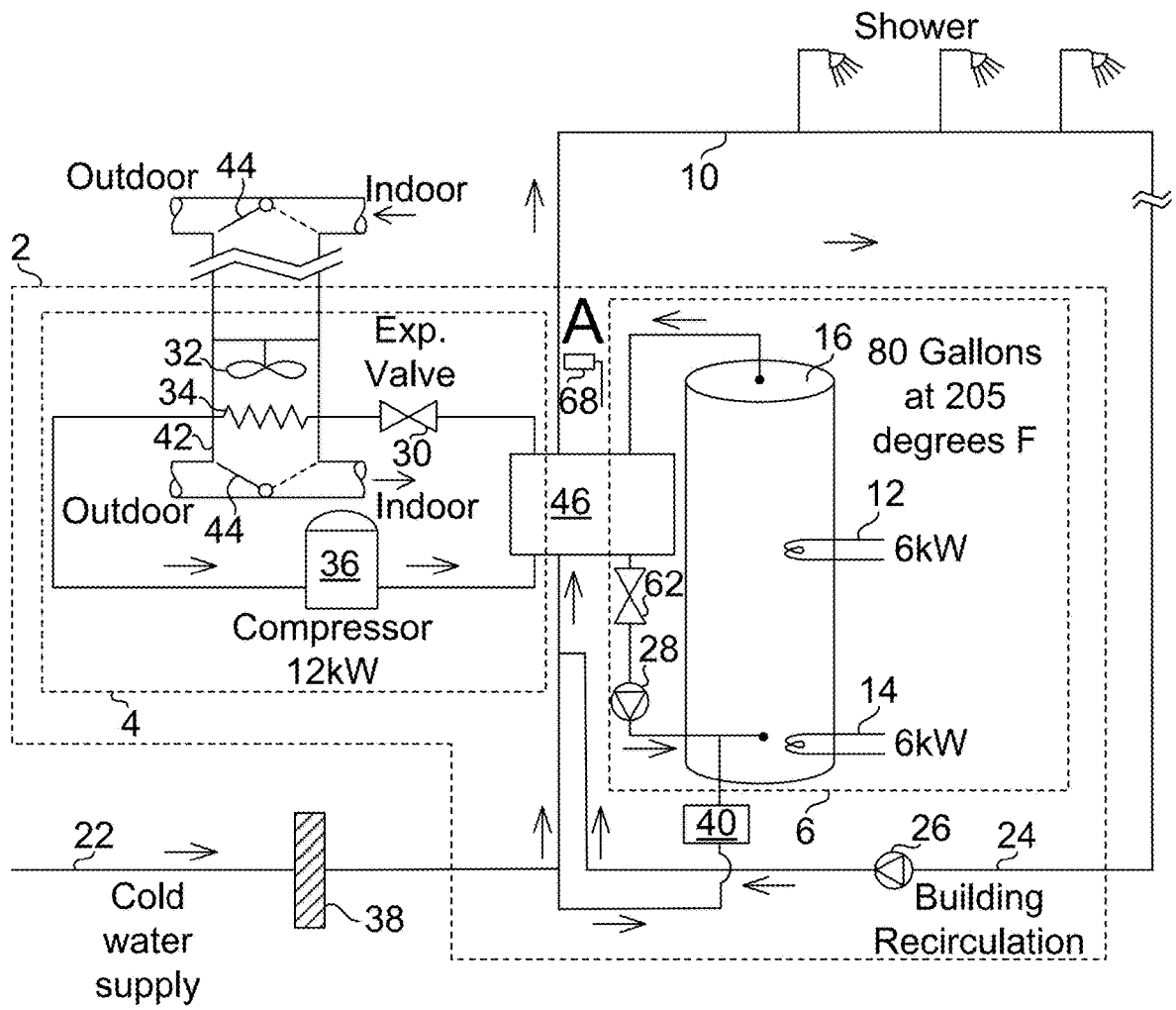
FIG. 4 is a diagram depicting yet another embodiment of a heat pump heating system.

FIG. 4 is a diagram depicting yet another embodiment of a heat pump heating system. In this embodiment, again, the hot water supply line 10 is fluidly decoupled from the thermal battery 6 and the heat engine 4. A heat exchanger 46, e.g., three-fluid plate type heat exchanger can be used to cause heat transfer from the refrigerant of the heat engine 4 to the domestic water flow in the hot water supply line 10, heat transfer from the fluid stored in the thermal battery 6 to the domestic water flow in the hot water supply line 10 or heat transfer from the refrigerant of the heat engine 4 to the fluid stored in the thermal battery 6. It shall be noted that, in this embodiment, heat transfer can occur from the refrigerant of the heat engine 4 to the fluid stored in the thermal battery 6 without disposing a coil around the tank 16 and heat transfer can occur from the fluid stored in the thermal battery 6 to at least a portion of the domestic water flow in the hot water supply line 10 without requiring a second heat exchanger.

Figure 5:
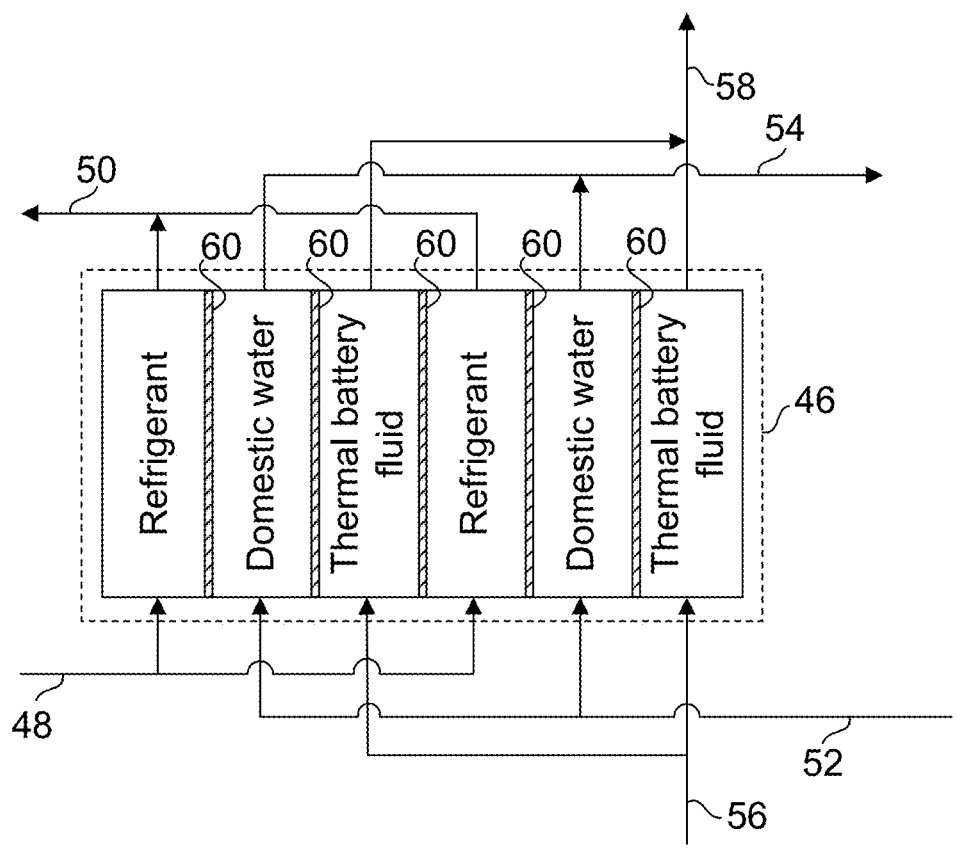
FIG. 5 is a diagram depicting fluid flows inside one embodiment of a three-fluid flow plate type heat exchanger as shown in FIG. 4.

FIG. 5 is a diagram depicting fluid flows inside one embodiment of a three-fluid flow plate type heat exchanger 46 as shown in FIG. 4. The cells delineated by the heat transfer plates 60 are arranged in the following flow patterns: Refrigerant-Domestic Water-Thermal Battery Fluid-Refrigerant-Domestic Water-Thermal Battery Fluid. There is a separate sub-inlet for each of the two cells for each of the flows. For instance, there is an inlet 48 for the refrigerant flow of the heat pump that splits into two sub-inlets each into one of two cells of the heat exchanger 46. Similarly, each of the sub-outlets of the refrigerant flow is combined to form a flow through the outlet 50 of the refrigerant flow of heat pump upon leaving the heat exchanger 46. There is an inlet 52 for the domestic water that splits into two sub-inlets into two cells of the heat exchanger 46. Similarly, each of the sub-outlets of the domestic water flow is combined to form a flow through the outlet 54 of the domestic water flow upon leaving the heat exchanger 46. There is an inlet 56 for the thermal battery fluid flow that splits into two sub-inlets into two cells of the heat exchanger 46. Similarly, each of the sub-outlets of the thermal battery fluid flow is combined to form a flow through the outlet 58 of the thermal battery fluid flow upon leaving the heat exchanger 46. In one embodiment, in order for heat transfer to occur from the refrigerant flow to the domestic water flow, the refrigerant flow is disposed at about 120 degrees F. and pump 28 is disposed in the off position. Note that both the refrigerant sub-flows are capable of transferring heat to the domestic water sub-flows as these flows are disposed adjacent one another. In one embodiment, in order for heat transfer to occur from the thermal battery fluid flow to the domestic water flow, pump 28 is disposed in the on position and compressor 36 is disposed in the off position. Again, note that both the thermal battery fluid sub-flows are capable of transferring heat to the domestic water sub-flows as these flows are disposed adjacent one another. In one embodiment, in order for heat transfer to occur from the refrigerant flow to the thermal battery fluid flow, the compressor 36 is disposed in the on position and the refrigerant flow is disposed at about 120 degrees F. It shall be noted that in a traditional plate type configuration, i.e., the heat transfer plates 60 are all disposed in a parallel configuration, only one pair of sub-flows of the refrigerant and the thermal battery fluid is disposed adjacent one another and the domestic water sub-flows are not fully thermally decoupled from either a refrigerant or thermal battery fluid sub-flow. In one embodiment not shown, in order to enhance heat transfer, the number of sets of sub-flows, and therefore the number of heat transfer plates 60, can be increased such that the surface areas of the various flows are increased.

Figure 6:
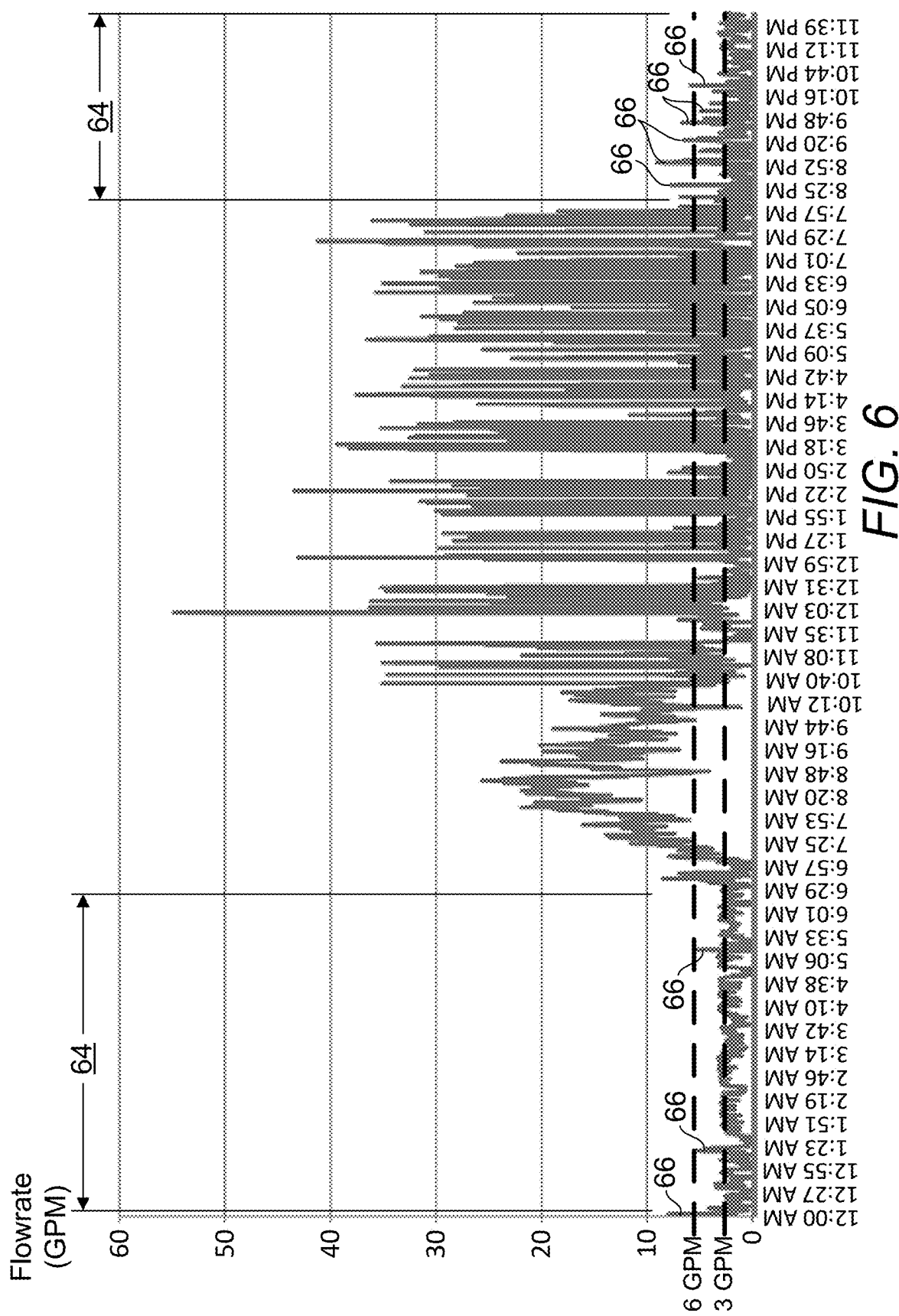
FIG. 6 is a chart depicting a sample of the flowrates measured at point C of a water heater for a time span of twelve hours at a large hot water user location (e.g., hotel).

In an effort to provide a heating system with higher efficiencies, the thermal battery 6 would not always be maintained at about 205 degrees F. as the higher the thermal battery fluid temperature is, the standby losses will be higher. In one embodiment, the setpoint temperature of the contents of the thermal battery or a flow within the closed loop conductor can be lowered to a lower setpoint temperature, e.g., 195 degrees F. and a flow modifier is used for controlling the contents of the thermal battery to the lower setpoint temperature. Historical data may be collected and analyzed over a period of time to determine whether the thermal battery fluid temperature may be dropped without negatively impacting the capability of the thermal battery in servicing hot water demands. FIG. 6 is a chart depicting a sample of the flowrates measured at point A (see any one of FIGS. 2-4) of a heating system, e.g., by using flow meter 68, for a time span of twenty-four hours at a large establishment, e.g., hotel with many hot water users. The time spans in which only external recirculation is active are labelled 64 as this is a period where the flowrate is observed to be at its minimum at about 3 GPM. These time spans are determined to be time spans in which an event where only external recirculation is active based on the flowrate readings being minimum and sustained over at least a long period of time, i.e., from about 12 AM to about 6:29 AM and again from about 8:25 PM to about 11:39 PM, i.e., over 30 minutes. During these time spans, there are demands at points of use. It shall be noted that, with the exception of several flowrate spikes 66 over these long periods of time, i.e., over 60 minutes each, the minimum non-zero flowrate has been rather steady. In one embodiment, flowrate spikes are not factored into the consideration or determination of a minimum non-zero flowrate as such spikes typically last momentarily and responding to such spikes will be counterproductive as the spikes are short-lived or sparing demands or usage. In one embodiment, an increase in demand is considered short-lived if the increase lasts under 10 seconds. Unless, in the highly unlikely event that hot water demands are constantly requested during the 12-hour span, the minimum flow at 3 GPM can be considered a result of external recirculation. In one embodiment, without considering the flowrate spikes, when the flowrate is twice as large as the minimum flow, pump 26 is turned off as the total demand is considered sufficiently large to already effectuate external recirculation. When the flowrate drops below 1.5 times the minimum flow, pump 26 is turned back on to cause external recirculation again. The act of lowering the setpoint temperature setpoint (by an amount) of a heating device or a thermal battery is called setting back the setpoint temperature by the amount. The present system may be programmed to progressively provide a setback of the setpoint temperature of a flow within the closed loop conductor. For example, a first amount of setback of, e.g., 5 degrees F., can be effectuated for the first week upon detecting the pattern indicating that the setpoint temperature of a flow within the closed loop conductor can be adjusted to conserve energy. If this pattern persists in the first week, the setback can be set even larger in the second week, e.g., 10 degrees, if again, no demands are requested during the period in which the setpoint temperature of a flow within the closed loop conductor is set back in the first week. This adjustment continues until the setpoint temperature of a flow within the closed loop conductor is deemed too low for providing suitable hot water when a demand is requested.

In one embodiment, each time span of a day used is at least about 60 minutes. In other words, in order for a flowrate pattern to be considered significant in the day, the duration within which this flowrate pattern occurs has to be at least about 60 minutes. The use of such a time span of a day removes fluctuations due to factors unrelated to an external recirculation.

In one embodiment, the time period is about one week. By having observed the flowrate at point A of a water heater for a week, the hot water consumption pattern can be established for both weekend days and weekdays.

In one embodiment, each overlap used is at least about 30 minutes out of the time span of a day where a flowrate pattern indicating external recirculation only that lasts for at least about 60 minutes in duration has been previously identified. For instance, if the duration 12 AM-4 AM Monday of one week has been identified as a time span where no demand exists and 12:30 AM-5:30 PM Tuesday of the same week has also been identified as a time span where no demand exists, the overlap would be from 12:30 AM-4 AM, which is greater than 30 minutes. In one embodiment, the frequency threshold is about three. In other words, if applied to the same example here, another overlap of at least 30 minutes from another day (for a total of three) within the same week will confirm the overlapped time span of a specific flowrate pattern where subsequent one or more actions will be taken to react to this flowrate pattern. By only reacting to a pattern established within a substantial time span, excessive changes in the setpoint temperature of a flow within the closed loop conductor can be avoided, removing the potential that pump 28 is turning on and off excessively frequently or that pump 28 is modulated excessively frequently or that valve 62 is modulated excessively frequently, in attempting to meet the setpoint temperature of a flow within the closed loop conductor, which not only will not result in significant energy savings but will cause excessive wear and tear in pump 28 and valve 62.

As a summary, disclosed herein is a method for setting the setpoint temperature of a fluid stored in a thermal battery of a system for heating a first fluid flow from a first temperature to a second temperature. The system further includes a hot water supply line for receiving the first fluid flow at a first end and exhausting the first fluid flow at a second end; a heating system including a heat engine; a heat exchanger; a flow meter configured for detecting a flowrate through the hot water supply line, a temperature sensor configured for sensing the temperature of the contents of the thermal battery. The thermal battery further includes a closed loop fluid conductor for circulating a second fluid flow that is configured to cause transfer of heat from the thermal battery to the first fluid flow at a heat transfer rate via the heat exchanger and a flow modifier interposed within the closed loop conductor wherein the flow modifier is configured to effect heat transfer at a heat transfer rate by varying the flowrate of the second fluid flow; and a controller operably connected to at least the flow meter, the temperature sensor and the flow modifier. The thermal battery is configured to be replenished at a point of heat transfer by the heat engine and the hot water supply line is configured to receive heat from the thermal battery via the heat exchanger to elevate the temperature of the first fluid flow from the first temperature to the second temperature. The method includes using the controller for:

(a) determining at least one event from flowrate data of the flow meter over a time period of a plurality of days, e.g., 7 days or a week, the event including a time span of a day in which the flowrate remains below or at a threshold value over the time span of a day within each day of the plurality of days;

(b) determining overlaps of each event to another one of the events of all days within the time period. It is possible that there can be multiple time spans within a day where flowrate remains below or at the threshold value. Therefore the number of events can be greater than one in a day; and (c) determining a frequency of the overlaps of each event over the time period and if the frequency exceeds a frequency threshold, executing a counteraction pair including a first action and a second action in opposition to the first action during a time span corresponding to each event, wherein the first action is executed at the start of the time span corresponding to each event, the second action is executed at the end of the time span corresponding to each event within a new time period.

In one embodiment, the counteraction pair includes:

(a) lowering the setpoint temperature of the contents of the thermal battery to a lower setpoint temperature and using the flow modifier to control the contents of the thermal battery to the lower setpoint temperature; and (b) raising the temperature setpoint of the contents of the thermal battery to a higher setpoint temperature and using the flow modifier to control the contents of the thermal battery to the higher setpoint temperature.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A method for setting the setpoint temperature of a fluid stored in a thermal battery of a system for heating a first fluid flow from a first temperature to a second temperature, wherein the system further comprises a supply line for receiving the first fluid flow at a first end and exhausting the first fluid flow at a second end; a heating system comprising a heat engine; a first heat exchanger; a second heat exchanger; a flow meter configured for detecting a flowrate through the supply line, a temperature sensor configured for sensing the temperature of the contents of the thermal battery, the thermal battery further comprises a closed loop fluid conductor for circulating a second fluid flow that is configured to cause transfer of heat from the thermal battery to the first fluid flow at a heat transfer rate via the heat exchanger and a flow modifier interposed within the closed loop conductor wherein the flow modifier is configured to effect heat transfer at a heat transfer rate by varying the flowrate of the second fluid flow, the thermal battery is configured to receive the second fluid flow, wherein the second fluid flow is fluidly decoupled from the first fluid flow and the heat engine is directly coupled to the supply line via the second heat exchanger; and a controller operably connected to at least the flow meter, the temperature sensor and the flow modifier, wherein the thermal battery is configured to be replenished at a point of heat transfer by the heat engine and the supply line is configured to receive heat from the thermal battery via the first heat exchanger and from the heat engine via the second heat exchanger to elevate the temperature of the first fluid flow from the first temperature to the second temperature, said method comprising using the controller for:
(a) determining at least one event from flowrate data of the flow meter over a time period of a plurality of days, said event comprising a time span of a day in which the flowrate remains below or at a threshold value over said time span of a day within each day of said plurality of days;
(b) determining overlaps of said each event to another one of said each event of all days within said time period; and
(c) determining a frequency of the overlaps of said each event over said time period and if the frequency exceeds a frequency threshold, executing a counteraction pair including a first action and a second action in opposition to the first action during a time span corresponding to said each event, wherein said first action is executed at the start of said time span corresponding to said each event, said second action is executed at the end of said time span corresponding to said each event within a new time period.

2. The method of claim 1, wherein said counteraction pair comprises:
(a) lowering the setpoint temperature of the contents of the thermal battery to a lower setpoint temperature and using the flow modifier to control the contents of the thermal battery to the lower setpoint temperature; and
(b) raising the temperature setpoint of the contents of the thermal battery to a higher setpoint temperature and using the flow modifier to control the contents of the thermal battery to the higher setpoint temperature.

3. A method for setting the setpoint temperature of a fluid stored in a thermal battery of a system for heating a first fluid flow from a first temperature to a second temperature, wherein the system further comprises a supply line for receiving the first fluid flow at a first end and exhausting the first fluid flow at a second end; a heating system comprising a heat engine; a heat exchanger; a flow meter configured for detecting a flowrate through the supply line, a temperature sensor configured for sensing the temperature of the contents of the thermal battery, the thermal battery further comprises a closed loop fluid conductor for circulating a second fluid flow that is configured to cause transfer of heat from the thermal battery to the first fluid flow at a heat transfer rate via the heat exchanger and a flow modifier interposed within the closed loop conductor wherein the flow modifier is configured to effect heat transfer at a heat transfer rate by varying the flowrate of the second fluid flow, the thermal battery is configured to receive the second fluid flow, wherein the second fluid flow is fluidly decoupled from the first fluid flow; and a controller operably connected to at least the flow meter, the temperature sensor and the flow modifier, wherein the supply line, the heat engine and the thermal battery are configured to be directly thermally coupled in the heat exchanger, said supply line is configured to receive heat from at least one of the heat engine and the thermal battery to elevate the temperature of the first fluid flow from the first temperature to the second temperature and the thermal battery is configured to be replenished by the heat engine, said method comprising using the controller for:
(a) determining at least one event from flowrate data of the flow meter over a time period of a plurality of days, said event comprising a time span of a day in which the flowrate remains below or at a threshold value over said time span of a day within each day of said plurality of days;
(b) determining overlaps of said each event to another one of said each event of all days within said time period; and
(c) determining a frequency of the overlaps of said each event over said time period and if the frequency exceeds a frequency threshold, executing a counteraction pair including a first action and a second action in opposition to the first action during a time span corresponding to said each event, wherein said first action is executed at the start of said time span corresponding to said each event, said second action is executed at the end of said time span corresponding to said each event within a new time period.

4. The method of claim 3, wherein said counteraction pair comprises:
(a) lowering the setpoint temperature of the contents of the thermal battery to a lower setpoint temperature and using the flow modifier to control the contents of the thermal battery to the lower setpoint temperature; and
(b) raising the temperature setpoint of the contents of the thermal battery to a higher setpoint temperature and using the flow modifier to control the contents of the thermal battery to the higher setpoint temperature.

* * * * *